US011978905B2

(12) United States Patent
Zhong

(10) Patent No.: US 11,978,905 B2
(45) Date of Patent: May 7, 2024

(54) SECONDARY BATTERY, APPARATUS CONTAINING THE SECONDARY BATTERY, METHOD FOR THE PREPARATION OF THE SECONDARY BATTERY, AND BINDER COMPOSITION

(71) Applicant: Contemporary Amperex Technology Co., Limited, Ningde (CN)

(72) Inventor: Ze Zhong, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 149 days.

(21) Appl. No.: 17/746,917

(22) Filed: May 17, 2022

(65) Prior Publication Data
US 2022/0278331 A1 Sep. 1, 2022

Related U.S. Application Data

(63) Continuation of application No. PCT/CN2019/122666, filed on Dec. 3, 2019.

(51) Int. Cl.
*H01M 4/62* (2006.01)
(52) U.S. Cl.
CPC .................. *H01M 4/622* (2013.01)
(58) Field of Classification Search
None
See application file for complete search history.

(56) References Cited

U.S. PATENT DOCUMENTS 10,454,086 B2 10/2019 Jung et al.
2010/0120989 A1 5/2010 Keller et al.
(Continued)

FOREIGN PATENT DOCUMENTS

CN 101147284 A 3/2008
CN 103539888 A 1/2014
(Continued)

OTHER PUBLICATIONS

Machine Translation of JP 2019057487 (Year: 2019).*
(Continued)

*Primary Examiner* — Wyatt P McConnell
(74) *Attorney, Agent, or Firm* — East IP P.C.

(57) ABSTRACT

The present application discloses a secondary battery, an apparatus comprising the secondary battery, a process for the preparation of the secondary battery, and a binder composition. The secondary battery comprises a binder for bonding a first substance and a second substance, the binder comprising a polymer obtained by crosslinking a binder composition, wherein the binder composition comprises a cross-linkable polymer matrix and a cross-linking agent, the cross-linkable polymer matrix comprises one or more of monomer units represented by formula (I), and the cross-linking agent comprises a compound represented by formula (II). The secondary battery provided by the present application has an effectively improved cycle life.

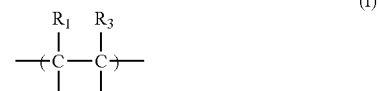
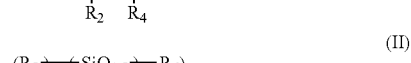

17 Claims, 2 Drawing Sheets

(56) References Cited

U.S. PATENT DOCUMENTS

2016/0149190 A1    5/2016  Fukuchi
2017/0133717 A1*   5/2017  Makino ............ H01M 10/0562

FOREIGN PATENT DOCUMENTS

| | | | |
|---|---|---|---|
| CN | 105637682 | A | 6/2016 |
| CN | 107093733 | A | 8/2017 |
| CN | 108493387 | A | 9/2018 |
| CN | 108933260 | A | 12/2018 |
| CN | 110492092 | A | 11/2019 |
| JP | H06329911 | A | 11/1994 |
| JP | 2003238923 | A | 8/2003 |
| JP | 2016105398 | A | 6/2016 |
| JP | 2017204468 | A | 11/2017 |
| JP | 2019504149 | A | 2/2019 |
| JP | 2019057487 | A | 4/2019 |
| JP | 2019057487 | † | 9/2019 |
| KR | 20190132031 | A | 11/2019 |

OTHER PUBLICATIONS

The International search report for PCT Application No. PCT/CN2019/122666, dated Sep. 2, 2020, 13 pages.
The First Office Action for Chinese Application No. 201980065954.1, dated Feb. 21, 2023, 9 pages.
The extended European search report for European Application No. 19955318.1, dated Oct. 17, 2022, 9 pages.
The First Office Action for IN Application No. 202227031221, dated Feb. 24, 2023, 6 pages.
The JP-Notice From JPO ( Provision of Information ) for JP Application No. 2022-513130, dated Feb. 27, 2023, 9 pages.
Ji Xiaoxiao et al: "A Si-doped flexible self-supporting comb-like polyethylene glycol copolymer (Si-PEG) film as a polymer electrolyte for an all solid-state lithium-ion battery", Journal of Materials Chemistry A, vol. 5, No. 46, Jan. 1, 2017 (Jan. 1, 2017), 9 pages.
The Second Office Action for Chinese Application No. 201980065954.1, dated May 11, 2023, 14 pages.
The First Office Action for JP Application No. 2022-513130, dated Mar. 27, 2023, 14 pages.

* cited by examiner
† cited by third party

SECONDARY BATTERY, APPARATUS CONTAINING THE SECONDARY BATTERY, METHOD FOR THE PREPARATION OF THE SECONDARY BATTERY, AND BINDER COMPOSITION

CROSS REFERENCE TO RELATED APPLICATION

This application is a continuation of International Application No. PCT/CN2019/122666, filed on Dec. 3, 2019, which is incorporated herein by reference in its entirety.

TECHNICAL FIELD

The present application belongs to the technical field of secondary batteries, and specifically relates to a secondary battery, an apparatus containing the secondary battery, a method for the preparation of the secondary battery and a binder composition.

BACKGROUND

Secondary batteries represented by lithium-ion secondary batteries have high charge-discharge performance, and no memory effect, are environmentally friendly, and are widely used in electric vehicles and consumer electronic products. With the rapid popularization of new energy vehicles, the demand for power secondary batteries has exploded. The market puts forward higher requirements for the service life of secondary batteries. Therefore, it is indeed necessary to provide a new technology that can further improve the cycle life of secondary batteries.

SUMMARY

The present application provides a secondary battery with a relatively high cycle life, an apparatus comprising the secondary battery, a process of the preparation of the secondary battery, and a binder composition that can improve cycle life of secondary batteries.

In order to achieve the above object, a first aspect of the present application provides a secondary battery, comprising a binder for bonding a first substance and a second substance, the binder comprising a polymer obtained by cross-linking a binder composition, wherein the binder composition comprises a cross-linkable polymer matrix and a cross-linking agent, the cross-linkable polymer matrix comprises one or more of monomer units represented by formula (I), and the cross-linking agent comprises a compound represented by formula (II):

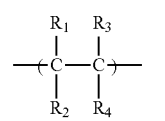

Formula (I)

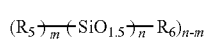

Formula (II)

in which
$R_1$, $R_2$ and $R_3$ are each independently selected from H and straight-chain or branched-chain alkyl groups with 1 to 8 carbon atoms;
$R_4$ is a polar group containing an active hydrogen;
$R_5$ is a reactive group to $R_4$;
$R_6$ is selected from H and substituted or unsubstituted hydrocarbon groups with 1 to 8 carbon atoms; and
n is an even number greater than or equal to 4, $2 \leq m \leq n$ preferably $m \geq 3$.

A second aspect of the present application provides an apparatus comprising the secondary battery according to the first aspect of the present application.

A third aspect of the present application provides a binder composition comprising a crosslinkable polymer matrix and a crosslinking agent, wherein the crosslinkable polymer matrix comprises monomer units represented by formula (I), and the crosslinking agent comprises a compound represented by formula (II):

Formula (I)

Formula (II)

in which
$R_1$, $R_2$ and $R_3$ are each independently selected from H and straight-chain or branched-chain alkyl groups with 1 to 8 carbon atoms;
$R_4$ is a polar group containing an active hydrogen;
$R_5$ is a reactive group to $R_4$;
$R_6$ is selected from H and substituted or unsubstituted hydrocarbon groups with 1 to 8 carbon atoms; and
n is an even number greater than or equal to 4, $2 \leq m \leq n$ preferably $m \geq 3$.

A fourth aspect of the present application provides a process for the preparation of a secondary battery, comprising binding a first substance and a second substance with a binder, the binder comprising a polymer obtained by cross-linking a cross-linkable polymer matrix and a cross-linking agent, the cross-linkable polymer matrix comprises one or more of monomer units represented by formula (I), and the cross-linking agent comprises a compound represented by formula (II):

Formula (I)

Formula (II)

in which
$R_1$, $R_2$ and $R_3$ are each independently selected from H and straight-chain or branched-chain alkyl groups with 1 to 8 carbon atoms;
$R_4$ is a polar group containing an active hydrogen;
$R_5$ is a reactive group to $R_4$;
$R_6$ is selected from H and substituted or unsubstituted hydrocarbon groups with 1 to 8 carbon atoms; and
n is an even number greater than or equal to 4, $2 \leq m \leq n$ preferably $m \geq 3$.

In the secondary battery provided by the present application, a binder is used to bind a first substance and a second substance. The binder is obtained by crosslinking a binder composition comprising a crosslinkable polymer matrix and a crosslinking agent. The crosslinkable polymer matrix comprises monomer units represented by the formula (I), and the monomer unit has a polar group containing an active hydrogen, allowing the binder to have good affinity to the first substance and the second substance, so that there is a strong interaction between the first substance and the second substance. In particular, the cross-linking agent comprises a compound represented by formula (II), which compound has two or more groups reactive with the active hydrogen-containing polar group of the monomer unit, so that the binder composition upon crosslinking forms a good cross-linked structure, whereby the interaction force between the first substance and the second substance can be greatly improved. Therefore, in the secondary battery, the first substance and the second substance both are bound firmly, so that the structural stability and cycle life of the battery both are improved.

In particular, when the first substance and the second substance both are a negative electrode active material, a strong interaction is formed between the negative electrode active material particles via a binding effect of the binder, thereby greatly improving the cohesion of the negative electrode plate. Therefore, the expansion problem of the negative electrode plate during cold-press forming and the charge-discharge cycle of the secondary battery is effectively alleviated, so that the cycle life and safety performance of the battery can be improved.

When the first substance is a negative electrode active material and the second substance is a negative electrode current collector, a high bonding force between the negative electrode active material and the negative electrode current collector is formed by a binding effect of the binder, so that the negative electrode active material adheres effectively to the negative electrode current collector. Thus, the negative electrode plate has a high bonding strength, and it is not easy to release and drop powder. The negative electrode plate has less volume change during the charge-discharge cycle and is capable of reducing the cycle expansion of batteries. Therefore, the cycle life and safety performance of the battery can be improved.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
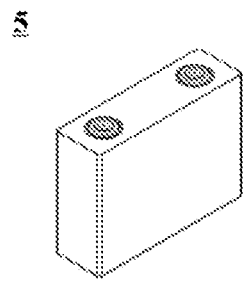
FIG. 1 is a schematic diagram of a secondary battery provided by an embodiment of the present application.

Among them, the reference signs are explained as follows: 1. Battery pack; 2. Upper case body; 3. Lower case body; 4. Battery module; 5. Secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. The recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Electric energy is increasingly used in various apparatus as an economical, practical, clean and easily controllable and convertible form of energy. Secondary batteries have become the preferred power source for apparatus due to their high energy density, easy portability, no memory effect, and environmental friendliness.

Secondary Battery

Thus, the first aspect of the present application provide a secondary battery.

The secondary battery comprises a positive electrode plate, a negative electrode plate, a separator, and an electrolyte. During the charging and discharging process of the battery, active ions are intercalated and de-intercalated back and forth between the positive electrode and the negative electrode. The separator is arranged between the positive electrode plate and the negative electrode plate for isolation. The electrolyte functions as conducting ions between the positive electrode and the negative electrode.

In actual production and application, it is often necessary to use a binder to realize binding of a first substance and a second substance in secondary batteries. The binding performance between the first substance and the second substance has an important influence on performance such as cycle life of secondary batteries, which in turn affects working performance and working efficiency of apparatus. The present application provides a secondary battery, which comprises a binder, and the binder is used for bonding a first substance and a second substance, and can ensure a good bonding effect between the first substance and the second substance.

In the secondary battery provided in the present application, the binder comprises a polymer obtained by crosslinking a binder composition, wherein the binder composition comprises a cross-linkable polymer matrix and a cross-linking agent, the cross-linkable polymer matrix comprises one or more of monomer units represented by formula (I), and the cross-linking agent comprises a compound represented by formula (II):

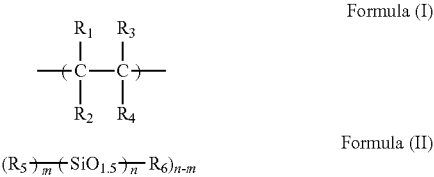

in which $R_1$, $R_2$ and $R_3$ are each independently selected from H and straight-chain or branched-chain alkyl groups with 1 to 8 carbon atoms;

$R_4$ is a polar group containing an active hydrogen;

$R_5$ is a reactive group to $R_4$;

$R_6$ is selected from H and substituted or unsubstituted hydrocarbon groups with 1 to 8 carbon atoms; and n is an even number greater than or equal to 4, $2 \leq m \leq n$ preferably $m \geq 3$.

In the secondary battery of the present application, the monomer unit represented by the formula (I) is a basic structural unit of the crosslinkable polymer matrix. In some embodiments, $R_1$ is selected from H and a straight-chain or branched alkyl group with 1 to 8 carbon atoms, preferably from H and a straight-chain or branched chain alkyl group with 1 to 4 carbon atoms. For example, $R_1$ can be selected from H, methyl, ethyl, n-propyl, isopropyl, n-butyl, isobutyl, sec-butyl, tert-butyl, n-pentyl, isopentyl, n-hexyl, n-heptyl, n-octyl, and the like. Preferably, $R_1$ is selected from H, methyl, ethyl, n-propyl, isopropyl, n-butyl, isobutyl, sec-butyl, and tert-butyl; more preferably, $R_1$ is selected from H, methyl, and ethyl, especially preferably H.

When $R_1$ is selected from a straight-chain or branched-chain alkyl groups with 1 to 8 carbon atoms, one or several hydrogens of the alkyl group may be further substituted by other elements or groups. Other elements can be, but are not limited to, F, Cl, O, and the like. Other groups can be, but are not limited to, hydroxyl, amine, phenyl, methoxy, and the like.

In some embodiments, $R_2$ is selected from H and a straight-chain or branched alkyl group with 1 to 8 carbon atoms, preferably H and a straight-chain or branched alkyl group with 1 to 4 carbon atoms. For example, $R_2$ can be selected from H, methyl, ethyl, n-propyl, isopropyl, n-butyl, isobutyl, sec-butyl, tert-butyl, n-pentyl, isopentyl, n-hexyl, n-heptyl, n-octyl, and the like. Preferably, $R_2$ is selected from H, methyl, ethyl, n-propyl, isopropyl, n-butyl, isobutyl, sec-butyl, and tert-butyl; more preferably, $R_2$ is selected from H, methyl, ethyl, n-propyl, and isopropyl.

When $R_2$ is selected from straight-chain or branched alkyl groups with 1 to 8 carbon atoms, one or several hydrogens of the alkyl group may be further substituted by other elements or groups. Other elements can be, but are not limited to, F, Cl, O, and the like. Other groups can be, but are not limited to, hydroxyl, amine, phenyl, methoxy, and the like.

In some embodiments, $R_3$ is selected from H, and a straight-chain or branched alkyl group with 1 to 8 carbon atoms, preferably H, and a straight-chain or branched alkyl group with 1 to 4 carbon atoms. For example, $R_3$ can be selected from H, methyl, ethyl, n-propyl, isopropyl, n-butyl, isobutyl, sec-butyl, tert-butyl, n-pentyl, isopentyl, n-hexyl, n-heptyl, n-octyl, and the like. Preferably, $R_3$ is selected from H, methyl, ethyl, n-propyl, isopropyl, n-butyl, isobutyl, sec-butyl, and tert-butyl; more preferably, $R_3$ is selected from H, methyl, and ethyl, especially preferably is H or methyl.

When $R_3$ is selected from a straight-chain or branched-chain alkyl group with 1 to 8 carbon atoms, one or several hydrogens of the alkyl group may be further substituted by other elements or groups. Other elements can be, but are not limited to, F, Cl, O, and the like. Other groups can be, but are not limited to, hydroxyl, amine, phenyl, methoxy, and the like.

In some embodiments, $R_4$ is selected from

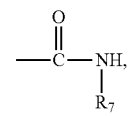

and $-(R^1)a-X$.

$R_7$ is selected from H, and a substituted or unsubstituted alkyl group with 1 to 6 carbon atoms, preferably H, and a substituted or unsubstituted alkyl group with 1 to 4 carbon atoms. For example, $R_7$ can be selected from H, methyl, ethyl, n-propyl, isopropyl, n-butyl, isobutyl, sec-butyl, tert-butyl, n-pentyl, isopentyl, n-hexyl, and the like. Preferably, $R_7$ is selected from H, methyl, ethyl, n-propyl, isopropyl, n-butyl, isobutyl, sec-butyl, and tert-butyl.

When $R_7$ is selected from a substituted alkyl group having 1 to 6 carbon atoms, one or several hydrogens of the alkyl group may be substituted by other elements or groups. Other elements can be, but are not limited to, F, Cl, O, and the like. Other groups can be, but are not limited to, hydroxyl, phenyl, and amino.

The subscript a is 0 or 1; $R^1$ is selected from phenylene, and a substituted or unsubstituted alkylene group with 1 to 6 carbon atoms, and X is selected from $-COOH$, $-SO_3H$, $-SO_2H$, hydroxyl, sulfhydryl, and amino. Preferably, $R^1$ is selected from phenylene, and a substituted or unsubstituted alkylene group having 1 to 4 carbon atoms, and X is selected from $-COOH$ and hydroxyl.

In some embodiments, when a is 1, $R^1$ can be selected from phenylene, methylene, ethylene, propylene, isopropylidene, butylene, isobutylene, sec-butylene, tert-butylene, pentylene, isopentylene, and hexylene. Preferably, $R^1$ is selected from phenylene, methylene, ethylene, propylene, isopropylidene, butylene, isobutylene, sec-butylene, and tert-butylene; more preferably, $R^1$ is selected from phenylene, methylene, and ethylene.

In $R^1$, one or several hydrogens may be replaced by other elements or groups. The elements may be, but are not limited to, F, Cl, O, and the like. The groups can be, but are not limited to, hydroxyl, phenyl, amino, and the like.

These groups have higher reactivity and stronger polarity, which can further enhance the interaction between the first substance and the second substance and improve their bonding strength.

In some preferred embodiments, $R_4$ is selected from

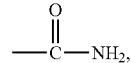

$-COOH$ and $-OH$.

In some preferred embodiments, the monomer unit represented by formula (I) can be selected from one or more of the following monomer units a to d.

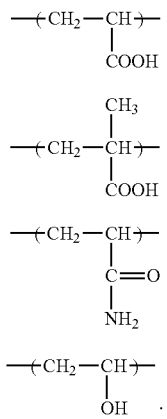

In some embodiments, the crosslinkable polymer matrix can be a homopolymer or a copolymer, and the copolymer can be a random copolymer, a block copolymer, an alternating copolymer, a graft copolymer.

In some preferred embodiments, the crosslinkable polymer matrix may be a copolymer having monomeric units of different acidity and basicity. In this way, the interaction between the first substance and the second substance can be enhanced, and the stability of the binder during battery cycle can be enhanced, so that the strong interaction between the first substance and the second substance can be maintained for an extended period.

In some preferred embodiments, the crosslinkable polymer matrix comprises one or more of a copolymer of monomer units a and d, a copolymer of monomer units c and d, a copolymer of monomer units b, c and d; more preferably, the crosslinkable polymer matrix comprises a copolymer of monomeric units b, c and d.

Further, the crosslinkable polymer matrix may further optionally comprise one or more of the monomer units shown in the following III-1 and III-2.

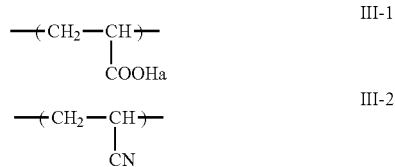

It was found by the inventors that when the crosslinkable polymer matrix further comprises the monomer unit III-1, it can further provide an excellent dispersion performance for particulate material, so that the resulting slurry is more stable and the film processing performance is improved. When the cross-linkable polymer matrix further comprises the monomer unit III-2, the affinity of the binder to the first substance and the second substance can be further improved, thereby further improving the interaction between the first substance and the second substance.

In the secondary battery of the present application, the compound represented by the formula (II) is a crosslinking agent. In some embodiments, in the compound represented by formula (II), n is an even number greater than or equal to 4 and less than or equal to 18, preferably an even number greater than or equal to 8 and less than or equal to 12. Moreover, it is preferred that m≥3, or m≥5, or m=n. In this way, the crosslinking reaction efficiency between the crosslinkable polymer matrix and the crosslinking agent is high, the crosslinking structure is improved, and the interaction between the first substance and the second substance can be further enhanced.

In some embodiments, in the compound represented by formula (II), $R_5$ can be selected from —$(R^2)_b$—Y, in which b is 0 or 1, $R^2$ is selected from a straight-chain or branched alkylene with 1 to 12 carbon atoms, and Y is selected from halogen, alkenyl, azide, amino, carboxyl, aldehyde, hydroxyl, sulfonic acid, sulfinic acid, phenolic hydroxyl, and epoxy group.

In some embodiments, when b is 1, $R^2$ can be selected from methylene, ethylene, propylene, isopropylidene, butylene, isobutylene, sec-butylene, tert-butylene, pentylene, isopentylene, hexylene, heptylene, and octylene. Preferably, $R^2$ is selected from methylene, ethylene, propylene, isopropylidene, butylene, isobutylene, sec-butylene, and tert-butylene.

In $R^2$, one or several hydrogens may be replaced by other elements or groups. Other elements can be, but are not limited to, F, Cl, O, and the like. Other groups can be, but are not limited to, hydroxyl, phenyl, amino, and the like.

Preferably, $R^2$ is selected from a straight-chain or branched alkylene group with 1 to 8 carbon atoms; more preferably, $R^2$ is selected from a straight-chain or branched alkylene group with 1 to 4 carbon atoms.

Preferably, Y is selected from amino, carboxyl, hydroxyl, epoxy.

In some preferred embodiments, $R_5$ is selected from halogen, alkenyl, azido, amino, carboxyl, aldehyde, hydroxyl, sulfonic acid, sulfinic acid, phenolic hydroxyl, and epoxy group; more preferably, $R_5$ is selected from amino, carboxyl, hydroxyl, and epoxy group.

$R_5$ group has higher reactivity and stronger polarity, which can further enhance the interaction between the first substance and the second substance and improve their bonding strength.

In some embodiments, in the compound represented by formula (II), $R_6$ can be selected from H, and a substituted or unsubstituted hydrocarbon group with 1 to 8 carbon atoms; preferably, $R_6$ is selected from H, and a substituted or unsubstituted hydrocarbon groups with 1 to 4 carbon atoms. For example, $R_6$ can be selected from H, methyl, ethyl, n-propyl, isopropyl, n-butyl, isobutyl, sec-butyl, tert-butyl, n-pentyl, isopentyl, n-hexyl, n-heptyl, n-octyl, and the like; preferably, $R_6$ is selected from methyl, ethyl, n-propyl, isopropyl, n-butyl, isobutyl, sec-butyl, and tert-butyl; more preferably, $R_6$ is selected from H, methyl, ethyl, n-propyl, and isopropyl.

In $R_6$, one or several hydrogens may be replaced by other elements or groups. The elements may be, but are not limited to, F, Cl, O, and the like. The groups can be, but not not limited to, hydroxyl, amino, and the like.

In the secondary battery provided by the present application, a binder is used to bind a first substance and a second substance. The binder comprises a polymer obtained by crosslinking a binder composition. The binder composition comprises a crosslinkable polymer matrix and a crosslinking agent. The crosslinkable polymer matrix comprises monomer units represented by the formula (I), and the monomer unit has a polar group containing an active hydrogen, allowing the binder to have good affinity to the first substance and the second substance, so that there is a strong interaction between the first substance and the second substance. In particular, the cross-linking agent comprises a compound represented by formula (II), which compound has two or more groups reactive with the active hydrogen-containing polar group of the monomer unit, so that the binder composition upon crosslinking forms a good cross-linked structure, whereby the interaction force between the first substance and the second substance can be greatly improved. Therefore, in the secondary battery, the first substance and the second substance both are bound firmly, so that the structural stability and cycle life of the battery both are improved.

In some embodiments, the cross-linked polymer of the binder composition has a three-dimensional cross-linked network structure. In this way, the bonding between the first substance and the second substance is significantly enhanced.

In some embodiments, the binder may further comprise other bonding materials. As an example, the binder may further comprise one or more of styrene-butadiene rubber, sodium carboxymethyl cellulose, polyvinylidene fluoride, polyvinylidene fluoride copolymer, polytetrafluoroethylene, polystyrene, polyacrylonitrile, polyacrylonitrile, polyimide, polyacrylic acid, sodium polyacrylate, polyvinyl alcohol, sodium alginate, polymethacrylic acid and carboxymethyl chitosan. As another example, the binder may further comprise one or more of styrene-butadiene rubber, sodium carboxymethyl cellulose, polyacrylic acid, sodium polyacrylate, polyvinyl alcohol, sodium alginate, polymethacrylic acid, and carboxymethyl chitosan.

According to the secondary battery of the present application, one or more of the positive electrode plate, the negative electrode plate and the separator of the secondary battery comprise the polymer obtained by cross-linking the binder composition as described in the present application.

In some embodiments, when one or more of the positive electrode plate, the negative electrode plate and the separator comprise the polymer obtained by cross-linking the binder composition as described in this application, they may further comprise other bonding material. Other bonding materials may be as described above.

In some preferred embodiments, the negative electrode plate comprises the polymer obtained by cross-linking the binder composition as described in this application.

In some preferred embodiments, the negative electrode film of the negative electrode plate comprises the polymer obtained by cross-linking the binder composition as described in this application. When the polymer is included in the negative electrode film, the interaction of the negative electrode active material particles can be significantly enhanced, thereby significantly reducing resilience of the negative electrode plate.

In some embodiments, the negative electrode film may further comprise other bonding materials. Other bonding materials may be as described above. For example, the negative electrode film may further comprise one or more of styrene-butadiene rubber and sodium carboxymethyl cellulose.

Preferably, a mass percentage of the crosslinked binder composition in the negative electrode film is ≥0.5%, ≥0.6%, or ≥1.0%; further, it may be ≤4.0%, ≤3.0%, ≤2.0%. The mass percentage of the cross-linked binder composition in the negative electrode film is within an appropriate range, which can effectively exert the above-mentioned effect of the binder and allow the secondary battery have a higher energy density at the same time. More preferably, the mass percentage of the crosslinked binder composition in the negative electrode film is from 1.0% to 3.0%.

[Negative Electrode Plate]

The negative electrode plate of the secondary battery according to the present application comprises a negative electrode current collector and a negative electrode film disposed on at least one surface of the negative electrode current collector. As an example, the negative electrode current collector has two opposite surfaces in its own thickness direction, and the negative electrode film is laminated on either or both of the two opposite surfaces of the negative electrode current collector.

The negative electrode current collector can be made of materials with good electrical conductivity and mechanical strength. In some embodiments, a copper foil may be used as the negative electrode current collector.

The negative electrode film comprises a negative electrode active material. The present application does not specifically limit the specific types of negative active materials, and those skilled in the art can make selections according to actual needs. In some embodiments, the negative electrode active material may include one or more of silicon-based materials (e.g., elemental silicon, silicon-oxygen compounds, silicon-carbon composites, silicon-nitrogen compounds, silicon alloys, and the like), graphite materials (e.g., artificial graphite, natural graphite), tin-based materials (e.g. elemental tin, tin oxides, tin alloys, and the like), mesophase microcarbon spheres (abbreviated as MCMB), hard carbon, soft carbon, lithium titanate, and other metals that can form alloys with active ions.

The negative electrode film further comprises a binder. In some preferred embodiments, the binder may comprise the aforementioned polymer obtained by cross-linking of the binder composition. Through the adhesion of the above-mentioned polymer, a strong interaction can be formed among the solid particulate materials (such as negative electrode active materials, conductive agents, and the like) in the negative electrode film, thereby improving the cohesion of the negative electrode film. At the same time, it also enables a higher bonding force between the negative electrode film and the negative electrode current collector. As a result, the negative electrode film is effectively adhered to the negative electrode current collector, so that the negative electrode plate has high strength, and is not easy to release or drop powder. Therefore, the resilience issue of the negative electrode plate during cold pressing and charging discharging cycle of the secondary battery is effectively alleviated, and the expansion of the negative electrode plate during the cycle of the battery is significantly reduced. The volume change of the battery is significantly reduced, so its energy density, cycle life and safety performance can be improved.

In some embodiments, the binder may further comprise other binder materials that can be used for negative electrode film. As an example, the binder may further comprise one or more of styrene-butadiene rubber (SBR), sodium carboxymethyl cellulose (CMC-Na), polyacrylic acid (PAA), sodium polyacrylate (PAAS), polyvinyl alcohol (PVA), sodium alginate (SA), polymethacrylic acid (PMAA), carboxymethyl chitosan (CMCS), polyvinylidene fluoride (PVDF), polytetrafluoroethylene (PTFE), ethylene vinyl acetate copolymer (EVA), polyvinyl alcohol (PVA) and polyvinyl butyral (PVB), such as one or more of styrene butadiene rubber, sodium carboxymethyl cellulose, polyacrylic acid, sodium polyacrylate, polyvinyl alcohol, sodium alginate, polymethacrylic acid and carboxymethyl chitosan. Preferably, the binder may further comprise styrene-butadiene rubber and sodium carboxymethyl cellulose.

By using the binder composition of the present application and other binder materials, the negative electrode film and the negative electrode plate can have both appropriate strength and flexibility while obtaining a higher bonding effect, so as to have a better processability.

In some embodiments, the negative electrode film optionally further comprises a conductive agent. As an example, the conductive agent used for the negative electrode film can be one or more selected from graphite, superconducting carbon, acetylene black, carbon black, Ketjen black, carbon dots, carbon nanotubes, graphene, and carbon nanofibers.

In some embodiments, optionally, a functional coating may also be provided between the negative electrode current collector and the negative electrode film, or on the surface of the negative electrode film away from the negative electrode current collector. The functional coating may comprise the polymer obtained by cross-linking of the binder composition as described herein. Optionally, the functional coating may further comprise other functional materials (e.g., conductive agents, ceramic particles, and the like). This application does not limit the specific types of functional materials, which can be selected according to actual functional requirements. Since the binder composition as described in this application upon cross-linking has a strong binding effect, it can make the components of the functional coating or between the functional coating and the negative electrode current collector and/or the negative electrode film to have high adhesion. Thereby, the functional coating can better exert its performance.

The preferred solutions of the binder or the binder composition herein are also applicable to the negative electrode plate here, and thus constitute each specific embodiment of the negative electrode plate. For the sake of brevity of the description, details are not repeated here.

[Positive Electrode Plate]

The positive electrode plate of the secondary battery according to the present application comprises a positive electrode current collector and a positive electrode film which is disposed on at least one surface of the positive electrode current collector and comprises a positive electrode active material. As an example, the positive electrode current collector has two opposite surfaces in its own thickness direction, and the positive electrode film is laminated on either or both of the two opposite surfaces of the positive electrode current collector.

The positive electrode current collector can be made of materials with good electrical conductivity and mechanical strength. In some embodiments, the positive electrode current collector may be an aluminum foil.

The present application does not specifically limit the specific types of positive active materials, and materials known in the art for the positive electrode of secondary battery can be used, and those skilled in the art can make selections according to actual needs.

In some embodiments, the secondary battery can be a lithium-ion secondary battery. The positive active material may be selected from lithium transition metal oxides and modified materials thereof, and the modified material may be lithium transition metal oxide subjected to doping modification and/or coating modification. For example, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with an olivine structure.

For example, the positive active material of the secondary battery according to the present application can be one or more selected from $LiCoO_2$, $LiNiO_2$, $LiMnO_2$, $LiMn_2O_4$, $LiNi_{1/3}CO_{1/3}M_{1/3}O_2$(NCM111), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

The positive electrode film further comprises a binder. In some preferred embodiments, the binder may comprise the aforementioned polymer obtained by cross-linking of the binder composition. Through the adhesion of the above-mentioned polymer, a strong interaction can be formed among the solid particulate materials (such as positive electrode active materials, conductive agents, and the like) in the positive electrode film, thereby improving the cohesion of the positive electrode film. At the same time, it also enables the positive electrode film and the positive electrode current collector therebetween to have a higher bonding force. As a result, the positive electrode film is effectively adhered to the positive electrode current collector, so that the positive electrode plate has high strength, and is not easy to release or drop powder.

In some embodiments, the binder may further comprise other binder materials that can be used for positive electrode film. As an example, the binder may further comprise one or more of styrene-butadiene rubber (SBR), sodium carboxymethyl cellulose (CMC-Na), polyacrylic acid (PAA), sodium polyacrylate (PAAS), polyvinyl alcohol (PVA), sodium alginate (SA), polymethacrylic acid (PMAA), carboxymethyl chitosan (CMCS), polyvinylidene fluoride (PVDF), polytetrafluoroethylene (PTFE), ethylene vinyl acetate copolymer (EVA), polyvinyl alcohol (PVA) and polyvinyl butyral (PVB), such as one or more of polyvinylidene fluoride, polytetrafluoroethylene, ethylene-vinyl acetate copolymer, polyvinyl alcohol, and polyvinyl butyral In some embodiments, the positive electrode film optionally further comprises a conductive agent. The types of the conductive agent are not specifically limited, and those skilled in the art can make selections according to actual needs. For example, the conductive agent used for the positive electrode film may comprise one or more of graphite, superconducting carbon, acetylene black, carbon black, Ketjen black, carbon dots, carbon nanotubes, graphene, and carbon nanofibers.

In some embodiments, optionally, a functional coating may also be provided between the positive electrode current collector and the positive electrode film, or on the surface of the positive electrode film away from the positive electrode current collector. The functional coating may comprise the polymer obtained by cross-linking of the binder composition as described herein. Optionally, the functional coating may further comprise other functional materials (e.g., conductive agents, ceramic particles, and the like). This application does not limit the specific types of functional materials, which can be selected according to actual functional requirements. Since the binder composition as described in this application upon cross-linking has a strong binding effect, it can make the components of the functional coating or the functional coating and the positive electrode current collector and/or the positive electrode film therebetween to have high adhesion. Thereby, the functional coating can better exert its performance.

The preferred solutions of the binder or the binder composition herein are also applicable to the positive electrode plate here, and thus constitute each specific embodiment of the positive electrode plate. For the sake of brevity of the description, details are not repeated here.

[Electrolyte]

The secondary battery of the present application further comprises electrolyte. The electrolyte conducts ions between the positive electrode plate and the negative electrode plate. There is no specific limitation on the type of electrolyte in the present application, and it can be selected according to the requirement. For example, the electrolyte may be at least one selected from solid electrolyte and liquid electrolyte (i.e., electrolytic solution).

In some embodiments, an electrolytic solution is used as the electrolyte. The electrolytic solution comprises an electrolyte salt and a solvent. The electrolytic solution infiltrates battery core to conduct ions. For example, the battery core can be a battery core with a laminated structure that is formed by stacking a positive electrode, a separator and a negative electrode in sequence, or a battery core with a rolled structure that is formed by stacking a positive electrode, a separator and a negative electrode in sequence and winding them.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In some embodiments, the electrolyte may also be a solid electrolyte, such as a polymer electrolyte or the like.

[Separator]

In the secondary batteries that use an electrolytic solution, and some secondary batteries that use solid electrolytes, a separator is also included. The separator is located between the positive electrode plate and the negative electrode plate to play a role of isolation. The separator comprises a substrate and optionally a functional coating disposed on at least one surface of the substrate. The functional coating may be used to improve thermal resistance and mechanical strength of separator. Optionally, the functional coating may further comprise other functional materials (e.g., ceramic particles, and other polymers). The present application does not limit the type of separator substrate, and any well-known porous structure separator substrate having electrochemical stability and mechanical stability can be selected. In some embodiments, the separator substrate can be one or more of glass fiber, non-woven fabric, polyethylene, and polypropylene. The separator can be a single-layer film or a multilayer film. When the separator is a multilayer film, the materials of each layer may be the same or different.

In some preferred embodiments, the functional coating of the separator may comprises the polymer obtained by crosslinking of the above-mentioned binder composition of the present application. Since the polymer has a strong binding effect, it can offer high adhesion among the components of the functional coating or between the functional coating and substrate. Thereby, the functional coating can better exert its performance.

The preferred solutions of the binder or the binder composition herein are also applicable to the separator here, and thus constitute each specific embodiment of the separator. For the sake of brevity of the description, details are not repeated here.

In some embodiments, the secondary battery may comprise an outer packaging and battery cores encapsulated in the outer packaging. The number of battery cores in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), and polybutylene succinate (PBS). Alternatively, the outer packaging of the secondary battery may be a hard case, such as an aluminum case.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
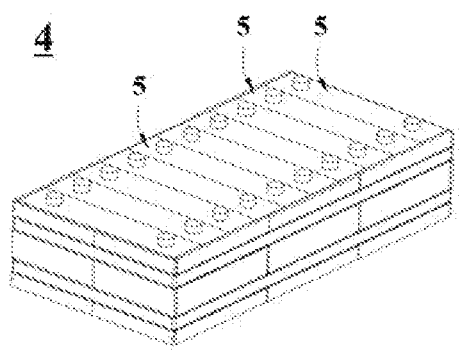
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
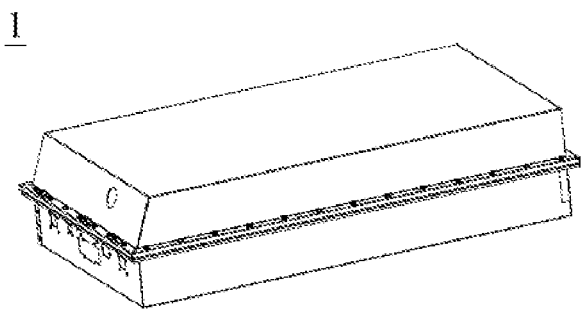
FIG. 3 is a schematic diagram of a battery pack provided by an embodiment of the present application.
Figure 4:
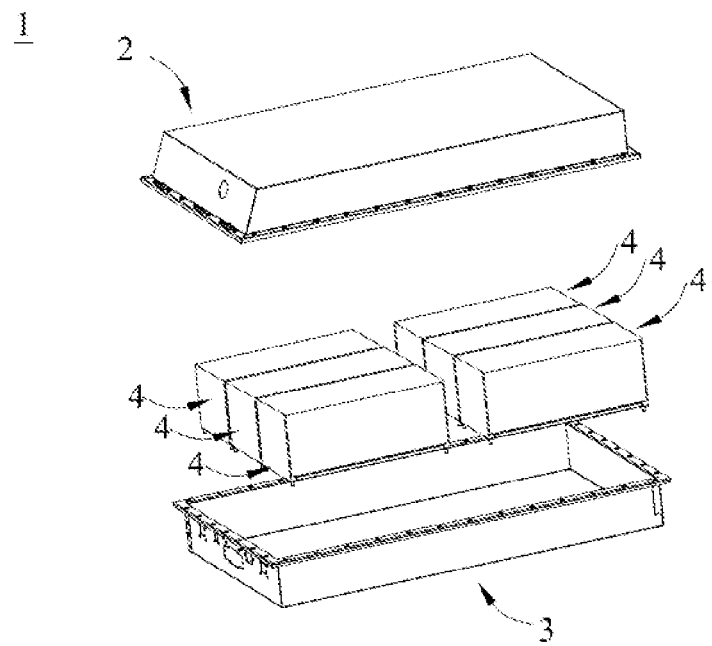
FIG. 4 is an exploded view of FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

[Preparation Process]

The present application also provides a process for the preparation of a secondary battery, the process comprising applying a binder composition to one or more of the positive electrode plate, the negative electrode plate and the separator, wherein the binder composition is subjected to a cross-linking reaction through heat treatment, and the binder composition comprises a cross-linkable polymer matrix and a cross-linking agent, the cross-linkable polymer matrix comprises one or more of monomer units represented by formula (I), and the cross-linking agent comprises a compound represented by formula (II):

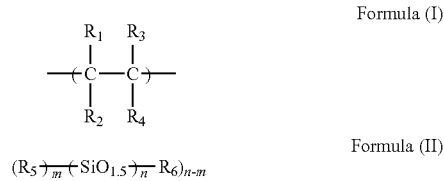

Formula (I)

$$(R_5)_m(SiO_{1.5})_n(R_6)_{n-m}$$

Formula (II)

in which $R_1$, $R_2$ and $R_3$ are each independently selected from H and straight-chain or branched-chain alkyl groups with 1 to 8 carbon atoms;

$R_4$ is a polar group containing an active hydrogen;

$R_5$ is a reactive group to $R_4$;

$R_6$ is selected from H and substituted or unsubstituted hydrocarbon groups with 1 to 8 carbon atoms; and n is an even number greater than or equal to 4, $2 \leq m \leq n$ preferably $m \geq 3$.

In some embodiments, the temperature at which the aforementioned binder composition is heat-treated to cause cross-linking may be from 60° C. to 160° C., preferably from 60° C. to 140° C., and more preferably from 80° C. to 120° C. For example, the crosslinkable polymer matrix and the crosslinking agent are crosslinked at a heating temperature of 60° C. to 160° C., of 60° C. to 140° C., or of 80° C. to 120° C. to form a polymer with a three-dimensional crosslinked network structure.

In some embodiments, the preparation process of the secondary battery further includes the step of assembling the negative electrode plate, the positive electrode plate, the separator and the electrolyte to form the secondary battery.

In some embodiments, the positive electrode plate, the separator, and the negative electrode plate can be wound or laminated in sequence, so that the separator is placed between the positive electrode plate and the negative electrode plate for isolation, thereby obtaining a battery core. The battery core is placed in an outer package, and the electrolyte is injected and sealed to obtain a secondary battery.

In some preferred embodiments, the preparation process of the secondary battery includes the step of applying the binder composition of the present application to the negative electrode plate.

In some more preferred embodiments, the step of applying the binder composition of the present application to prepare a negative electrode plate is:

S10, providing a negative electrode slurry, the negative electrode slurry comprising a negative electrode active material, the binder composition as described in this application, and an optional conductive agent.

In some embodiments, in step S10, the negative electrode active material, the binder composition as described in this application, and the optional conductive agent may be dispersed in a solvent, which may be deionized water, to form a uniform negative electrode slurry material. There is no particular restriction on their addition order. For example, a solution of the binder composition may be obtained first, and then the negative electrode active material and other additive materials may be added to the solution. Alternatively, components of the binder, the negative electrode active material and other additives can be added to a solvent respectively, to obtain the negative electrode slurry.

S20, applying the negative electrode slurry to at least one surface of the negative electrode current collector to obtain a negative electrode film.

S30, drying the negative electrode coating under the condition of heating, so as to remove the solvent and allow a crosslinking reaction of the crosslinkable polymer matrix and the crosslinking agent.

In some embodiments, in step S30, the drying temperature may be from 60° C. to 160° C., from 60° C. to 140° C., or from 80° C. to 120° C., or from 95° C. to 120° C. Under heating conditions, $R^4$ group of the crosslinkable polymer matrix and $R^5$ group of the crosslinking agent undergo a crosslinking reaction to form a crosslinked structure.

S40, after the dried negative electrode coating is subjected to processes such as cold pressing, a negative electrode plate is obtained.

The preferred embodiments for the binder or the binder composition herein are also applicable to the preparation process here, and thus constitute each specific embodiment of the preparation process. For the sake of brevity of the description, details are not repeated here.

[Apparatus]

The second aspect of the present application provides an apparatus, comprising the secondary battery according to the first aspect of the present application. The secondary battery provides power to the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, and the like.

The apparatus may comprise the secondary battery, the battery module or the battery pack selected according to its application requirements.

Figure 5:
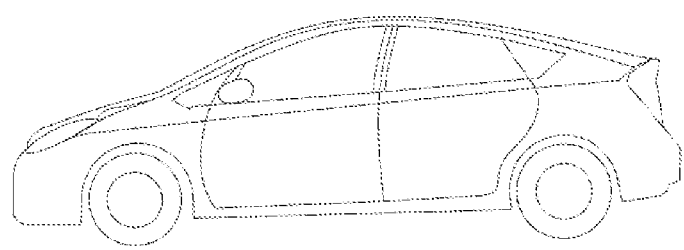
FIG. 5 is a schematic diagram of an apparatus provided by an embodiment of the present application.

FIG. 5 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, and the like. The apparatus is generally required to be thin and light, and the secondary battery can be used as a power supply.

[Binder Composition]

The present application provides a binder composition. The binder composition includes a crosslinkable polymer matrix and a crosslinking agent, the crosslinkable polymer matrix comprises one or more of the monomer units represented by formula (I), and the crosslinking agent comprises a compound represented by formula (II);

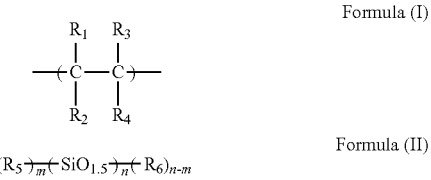

Formula (I)

Formula (II)

in which $R_1$, $R_2$ and $R_3$ are each independently selected from H and straight-chain or branched-chain alkyl groups with 1 to 8 carbon atoms;

$R_4$ is a polar group containing active hydrogen(s);

$R_5$ is a reactive group to $R_4$;

$R_6$ is selected from H and substituted or unsubstituted hydrocarbon groups with 1 to 8 carbon atoms; and n is an even number greater than or equal to 4, $2 \leq m \leq n$ preferably $m \geq 3$.

The particular embodiments and preferred embodiments for the binder or the binder composition herein are also applicable here. For the sake of brevity of the description, details are not repeated here.

In some embodiments, in the binder composition, based on the total weight of the crosslinkable polymer matrix and the crosslinking agent, a weight percentage of the crosslinkable polymer matrix is $\geq 70\%$, $\geq 75\%$, $\geq 80\%$, $\geq 85\%$, or $\geq 90\%$; further $\leq 99\%$, $\leq 98\%$, $\leq 97\%$, $\leq 96\%$, or $\leq 95\%$. Preferably, based on the total weight of the crosslinkable polymer matrix and the crosslinking agent, a weight percentage of the crosslinkable polymer matrix is from 75% to 95%, more preferably from 85% to 95%. In this way, the binder can form a good cross-linked three-dimensional network, thereby effectively exerting the effect of the binder.

In some embodiments, the crosslinkable polymer matrix has a weight average molecular weight that may be from 200,000 to 800,000, preferably from 400,000 to 600,000. The polymer binder material has an appropriate molecular weight, which can make it have a good solubility in polar solvents (such as water) while making the resulting solution have a suitable viscosity, so that solid phase materials (such as negative electrode active materials, conductive agent, and the like) is conducive to dispersing uniformly in the solution.

The molecular weight of the crosslinkable polymer matrix can be measured in a conventional manner in the art. For example, measurements can be made using laser light scattering techniques, which are well known to those skilled in the art.

In some embodiments, an aqueous solution of the binder composition with a concentration of 10 wt % has a viscosity of 150 mPa·s to 20000 mPa·s, preferably from 600 mPa·s to 4000 mPa·s, more preferably 600 mPa·s ~4000 mPa·s. In this way, when a slurry (e.g., an negative electrode slurry) of the binder composition to prepare a film or a coating is used, the solid phase material (e.g., negative active material, conductive agent, and the like) can be more uniformly dispersed in the slurry.

The viscosity of an aqueous solution of the binder composition with a concentration of 10 wt % can be measured in a conventional manner in the art. For example, it can be measured using a viscometer (such as a DV2T viscometer from Brookfield, USA), a technique well known to those skilled in the art. As an example, 1 g of the binder composition is dissolved in 9 g of deionized water, and the resulting solution is measured for its viscosity, which viscosity is recorded as the viscosity of an aqueous solution of the binder composition with a concentration of 10 wt %.

In some embodiment, an aqueous solution of the binder composition with a concentration of 10 wt % has a pH of greater than 7, preferably of 7.5 to 10.5, more preferably 8.0 to 10.0. It is found by the inventors that the cross-linkable polymer matrix has an appropriate content of active hydrogen, which can improve the cross-linking structure while making the binder have higher stability.

In some embodiments, the pH of the crosslinkable polymer matrix can be adjusted by introducing monomeric units with different acidity and basicity.

The pH of the crosslinkable polymer matrix can be measured in a conventional manner in the art. As an example, 1 g of the binder composition is dissolved in 9 g of deionized water, and the resulting solution is measured for its pH, which pH is recorded as the pH of an aqueous solution of the binder composition with a concentration of 10 wt %.

In some embodiments, both the crosslinkable polymer matrix and the crosslinking agent can be prepared using methods known in the art or obtained commercially.

In some embodiments, one or more of the monomers corresponding to the monomer units represented by formula (I) may be polymerized in the presence of an initiator to obtain a crosslinkable polymer matrix. The type of the initiator is not particularly limited, and can be conventionally selected in the field. For example, the initiator may be at least one selected from azo-based initiators (e.g., azobisisobutyronitrile, azobisisobutylamidine hydrochloride, azobisisobutylimidazoline hydrochloride, azodicyanovaleric acid, azodiisopropyl imidazoline, and the like). The polymerization conditions and the amount of the initiator are not particularly limited, and can be selected according to the specific types of monomers and initiators.

EXAMPLES

The following detailed descriptions will be given in conjunction with specific embodiments. It should be understood that these embodiments are only used for explaining the present application as various modifications and changes within the scope of the present disclosure will be apparent to those skilled in the art. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

I. Cross-Linkable Polymer Matrix and Cross-Linking Agent:

1. The crosslinkable polymer matrix A used in the following embodiments was selected from $A_1$ to $A_6$.

(1) $A_1$: A homopolymer of monomer unit c, with a molecular weight of 450,000, which was available from TCI Corporation.

(2) $A_2$: a copolymer of monomer unit b, monomer unit c and monomer unit d, which was prepared as follows. $CH_2=C(CH_3)COOH$, $CH_2=CHCONH_2$, and $CH_2=CHOH$ were charged in a molar ratio of 20:65:15 and then subjected to polymerization in the presence of initiator azodiisobutylamidine hydrochloride in which the initiator was used in an amount of 0.5 parts by weight relative to 100 parts by weight of the above three monomers. The polymerization was carried at a temperature of 25° C. to 35° C. and a pressure of 101 kPa for 2 to 4 hours, thereby obtaining the crosslinkable polymer matrix $A_2$ with a weight average molecular weight of 450,000.

(3) $A_3$: a copolymer of monomer unit c and monomer unit d, which was prepared as follows. $CH_2=CHCONH_2$, and $CH_2=CHOH$ were charged in a molar ratio of 85:15 and then subjected to polymerization in the presence of initiator azodiisobutylamidine hydrochloride in which the initiator was used in an amount of 0.5 parts by weight relative to 100 parts by weight of the above two monomers. The polymerization was carried at a temperature of 25° C. to 35° C. and a pressure of 101 kPa for 2 to 4 hours, thereby obtaining the crosslinkable polymer matrix $A_3$ with a weight average molecular weight of 550,000.

(4) $A_4$: a copolymer of monomer unit a and monomer unit d, which was prepared as follows. $CH_2=CHCOOH$ and $CH_2=CHOH$ were charged in a molar ratio of 85:15 and then subjected to polymerization in the presence of initiator azodiisobutylamidine hydrochloride in which the initiator was used in an amount of 0.5 parts by weight relative to 100 parts by weight of the above three monomers. The polymerization was carried at a temperature of 25° C. to 35° C. and a pressure of 101 kPa for 2 to 4 hours, thereby obtaining the crosslinkable polymer matrix $A_4$ with a weight average molecular weight of 600,000.

(5) $A_5$: a copolymer of monomer unit b, monomer unit d and monomer unit III-1, which was prepared as follows. $CH_2=C(CH_3)COOH$, $CH_2=CHOH$, and $CH_2=CHCOONa$ were charged in a molar ratio of 70:15:15 and then subjected to polymerization in the presence of initiator azodiisobutylamidine hydrochloride in which the initiator was used in an amount of 0.5 parts by weight relative to 100 parts by weight of the above three monomers. The polymerization was carried at a temperature of 25° C. to 35° C. and a pressure of 101 kPa for 2 to 4 hours, thereby obtaining the crosslinkable polymer matrix $A_5$ with a weight average molecular weight of 500,000.

(6) $A_6$: a copolymer of monomer unit b, monomer unit d and monomer unit III-2, which was prepared as follows. $CH_2=C(CH_3)COOH$, $CH_2=CHOH$, and $CH_2=CHCN$ were charged in a molar ratio of 70:15:15 and then subjected to polymerization in the presence of initiator azodiisobutylamidine hydrochloride in which the initiator was used in an amount of 0.5 parts by weight of the above three monomers. The polymerization was carried at a temperature of 25° C. to 35° C. and a pressure of 101 kPa for 2 to 4 hours, thereby obtaining the crosslinkable polymer matrix $A_6$ with a weight average molecular weight of 350,000.

2. The cross-linking agent B used in the following embodiments was selected from the following B1-B3 (B1-B3 is available from Gelest Company).

$(HO{-}_{\overline{8}}{-}SiO_{1.5})_8$    B1

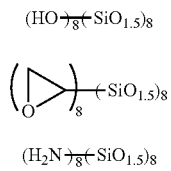    B2

$(H_2N{-}_{\overline{8}}{-}SiO_{1.5})_8$    B3

2. Preparation of Batteries

Example 1

Preparation of the Binder Composition

The above-mentioned crosslinkable polymer matrix A1 and crosslinking agent B1 were taken, which were mixed physically at a mass ratio of 95:5 to obtain the binder composition of the present application.

Preparation of Negative Electrode Plate

The negative electrode active material artificial graphite, the conductive agent Super P, the above-prepared binder composition, styrene-butadiene rubber SBR, and sodium carboxymethyl cellulose CMC-Na were mixed in a weight ratio of 96:1:1:1.5:0.5 into an appropriate amount of deionized water with fully stirring to form a uniform negative electrode slurry; the negative electrode slurry was applied to the surface of the negative electrode current collector copper foil, and after drying and cold pressing, the negative electrode plate was obtained. The temperature at which the negative electrode coating was dried was from 80° C. to 150° C.

Preparation of Positive Electrode Plate

The positive electrode active material $LiNi_{0.5}Co_{0.2}Mn_{0.3}O_2$ (NCM523), the conductive agent Super P, and the binder PVDF were mixed at a weight ratio of 96:2:2 into an appropriate amount of NMP to form a uniform positive electrode slurry; the positive electrode slurry was applied to the surface of the positive electrode current collector aluminum foil, and after drying and cold pressing, the positive electrode plate was obtained.

Preparation of Electrolyte

Ethylene carbonate (EC), ethyl methyl carbonate (EMC), and diethyl carbonate (DEC) were mixed in a volume ratio of 1:1:1, and then $LiPF_6$ was uniformly dissolved in the above solvent to obtain an electrolytic solution, in which the concentration of $LiPF_6$ was 1 mol/L.

Separator

Polyethylene (PE) membrane was used.

Preparation of Secondary Batteries

The positive electrode plate, the separator and the negative electrode plate were stacked in order, then wound to obtain a battery core. The battery core was put into an outer package, baked to remove water, into which the above electrolyte was added and then was packaged. Upon the steps of chemical formation, aging, and the like, a secondary battery was obtained.

Examples 2 to 19 and Comparative Examples 1 to 3

Examples 2 to 19 and comparative examples 1 to 3 were the same as Example 1 with the exception that the binder in the negative electrode plate was changed to obtain different secondary batteries. Please refer to Table 1 for details.

Test Section

1. Cohesion Force of Negative Electrode Plate:

A coated and cold-pressed negative electrode plate was cut into a test sample with a length of 100 mm and a width of 10 mm. A stainless steel plate with a width of 25 mm was taken on which a double-sided tape (width 11 mm) was pasted. The test sample was adhered to the double-sided tape on the stainless steel plate, and it was rolled back and forth three times (300 mm/min) with a 2000 g roller on its surface. The test sample was bent at 180 degrees, and the negative electrode film of the test sample and the current collector were manually peeled off by 25 mm. Then the test sample was fixed on a tensile tester of Instron 336 Type and stripped off at 30 mm/min continuously in which the peeling surface was kept to be consistent with the direction of drawing force of the tensile tester, i.e. 180 degrees peeling. Thus, a peel force curve was obtained, from which an average value at the smooth segment was regarded as the peel force $F_0$. Then the cohesion force F of the negative electrode plate to be tested was $F=F_0$/the width of the test sample, in N/m.

(2) Cycle Performance of Battery

At 25° C., the first charge and discharge were performed, and constant current and constant voltage charging was performed at a charging current of 0.5 C (i.e., the current value at which the theoretical capacity was fully discharged within 2 h) until the upper limit of voltage was 4.25V. Then, constant current discharge was performed at a discharge current of 0.5 C until the final voltage was 2.8V, and the discharge capacity value of the first cycle was recorded. Subsequently, 1000 charge-discharge cycles were performed, the discharge capacity value during the cycle was recorded, and the cycle capacity retention rate was calculated.

Capacity retention rate after the $1000^{th}$ cycle=(discharge capacity of the $1000^{th}$ cycle/discharge capacity of the $1^{st}$ cycle)×100%

(3) Cycle Expansion Force of Battery

The battery was assembled into a steel clamp in such a way that the bottom and four sides of the battery were close to the steel clamp. The steel plate was adjusted to preload to 2000N, a pressure sensor was placed between the steel clamp and the battery, connected to the computer, and the expansion force of the battery after 1000 cycles was measured.

binding force. The secondary battery using the negative electrode plate exhibited significantly improved cycle life and significantly reduced cycle expansion force.

In comparative example 1, conventional SBR and CMC-Na were used as a binder, in comparative example 2, the crosslinkable polymer matrix, SBR and CMC-Na were used as a binder, and in comparative example 3, the crosslinking agent, SBR and CMC-Na were used as binder. In these comparative examples, the interaction force between the negative electrode active material particles was low, so the cohesion of the negative electrode plate was low. The battery using the negative electrode plate had poor cycle life and high cycle expansion force.

From the results of Examples 1-6, it can be seen that by selection of a suitable cross-linkable polymer matrix, the cohesion of the negative electrode was further improved, and the cycle life and cycle expansion performance of the battery were further improved.

TABLE 1

|  | Crosslinkable Polymer Matrix A | Crosslinker B | Weight Ratio A:B | A + B Weight percentage [%] | SBR Weight percentage [%] | CMC-Na Weight percentage [%] | Cohesion of electrode plate [N/m] | Capacity retention rate after 1000 cycles [%] | Expansion force after 1000 cycles [N] |
|---|---|---|---|---|---|---|---|---|---|
| Example 1 | $A_1$ | $B_2$ | 95:5 | 1 | 1.5 | 0.5 | 77.2 | 82.8 | 18620 |
| Example 2 | $A_2$ | $B_2$ | 95:5 | 1 | 1.5 | 0.5 | 76.5 | 85.7 | 17363 |
| Example 3 | $A_3$ | $B_2$ | 95:5 | 1 | 1.5 | 0.5 | 75.9 | 83.1 | 18101 |
| Example 4 | $A_4$ | $B_2$ | 95:5 | 1 | 1.5 | 0.5 | 76.6 | 83.7 | 18257 |
| Example 5 | $A_5$ | $B_2$ | 95:5 | 1 | 1.5 | 0.5 | 78.1 | 84.0 | 18165 |
| Example 6 | $A_6$ | $B_2$ | 95:5 | 1 | 1.5 | 0.5 | 75.1 | 82.9 | 18483 |
| Example 7 | $A_2$ | $B_1$ | 95:5 | 1 | 1.5 | 0.5 | 72.8 | 83.1 | 18501 |
| Example 8 | $A_2$ | $B_3$ | 95:5 | 1 | 1.5 | 0.5 | 73.2 | 83.1 | 18475 |
| Example 9 | $A_2$ | $B_2$ | 70:30 | 1 | 1.5 | 0.5 | 46.9 | 77.7 | 20744 |
| Example 10 | $A_2$ | $B_2$ | 75:25 | 1 | 1.5 | 0.5 | 50.7 | 78.6 | 20328 |
| Example 11 | $A_2$ | $B_2$ | 80:20 | 1 | 1.5 | 0.5 | 58.3 | 80.3 | 19603 |
| Example 12 | $A_2$ | $B_2$ | 85:15 | 1 | 1.5 | 0.5 | 66.5 | 81.9 | 18943 |
| Example 13 | $A_2$ | $B_2$ | 90:10 | 1 | 1.5 | 0.5 | 73.9 | 83.3 | 18429 |
| Example 14 | $A_2$ | $B_2$ | 97:3 | 1 | 1.5 | 0.5 | 61.8 | 81.0 | 19308 |
| Example 15 | $A_2$ | $B_2$ | 95:5 | 0.5 | 1.5 | 1 | 65.0 | 82.7 | 18656 |
| Example 16 | $A_2$ | $B_2$ | 95:5 | 1 | 0.5 | 1.5 | 75.6 | 83.8 | 17980 |
| Example 17 | $A_2$ | $B_2$ | 95:5 | 1.5 | 1.5 | 0 | 83.7 | 84.5 | 17855 |
| Example 18 | $A_2$ | $B_2$ | 95:5 | 1.5 | 0 | 1.5 | 81.9 | 84.6 | 17841 |
| Example 19 | $A_2$ | $B_2$ | 95:5 | 3 | 0 | 0 | 84.6 | 86.0 | 17306 |
| Comparative Example 1 | / | / | / | 0 | 1.5 | 1.5 | 29.1 | 72.3 | 23474 |
| Comparative Example 2 | $A_2$ | / | / | 1 | 1.5 | 0.5 | 33.7 | 73.9 | 22600 |
| Comparative Example 3 | / | $B_2$ | / | 1 | 1.5 | 0.5 | 32.9 | 73.6 | 22741 |

In Table 1:
The weight ratio A:B represents: the weight ratio of the crosslinkable polymer matrix and the crosslinking agent in the binder composition;
The weight percentage of A+B represents: the weight percentage of the crosslinkable polymer matrix and the crosslinking agent in the negative electrode coating;
The weight percentage of SBR represents: the weight percentage of SBR in the negative electrode film;
The weight percentage of CMC-Na represents: the weight percentage of CMC-Na in the negative electrode film.

From the comparison of Examples 1-19 and Comparative Examples 1-3, it can be seen that the binder composition of the present application comprised the cross-linkable polymer matrix and the cross-linking agent, in the negative electrode using the binder composition, there was a strong interaction force between the negative active material particles of the electrode plate, and thus the cohesion of the negative electrode plate was significantly improved. At the same time, the negative electrode plate also had a high From the results of Examples 2, 7 and 8, it can be seen that the by selection of appropriate cross-linking agent, the cohesion of the negative electrode was further improved, and the cycle life and cycle expansion performance of the battery were further improved.

From the results of Examples 2 and 9-14, it can be seen that in the event that the weight ratio of the cross-linkable polymer matrix and the cross-linking agent in the binder composition is appropriate, the cohesion of the negative electrode was further improved, and the cycle life and cycle expansion performance of the battery were further improved.

From the results of Examples 2 and 15-19, it can be seen that by reasonably matching the cross-linkable polymer matrix and cross-linking agent with SBR and CMC-Na, the negative electrode had higher cohesion, and the battery had higher cycle life and lower cycle expansion force.

Here as some other embodiments of the present application.

Embodiment 1. A secondary battery comprising a binder for bonding a first substance and a second substance, the binder comprising a polymer obtained by crosslinking a binder composition, wherein the binder composition comprises a cross-linkable polymer matrix and a cross-linking agent, the cross-linkable polymer matrix comprises one or more of monomer units represented by formula (I), and the cross-linking agent comprises a compound represented by formula (II):

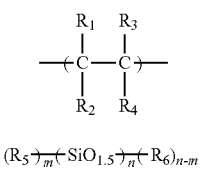

Formula (I)

$(R_5)_{\overline{m}}(SiO_{1.5})_{\overline{n}}(R_6)_{n-m}$

Formula (II)

in which
$R_1$, $R_2$ and $R_3$ are each independently selected from H and straight-chain or branched-chain alkyl groups with 1 to 8 carbon atoms;
$R_4$ is a polar group containing an active hydrogen;
$R_5$ is a reactive group to $R_4$;
$R_6$ is selected from H and substituted or unsubstituted hydrocarbon groups with 1 to 8 carbon atoms; and
n is an even number greater than or equal to 4, $2 \leq m \leq n$ preferably $m \geq 3$.

Embodiment 2. The secondary battery as claimed in Embodiment 1, wherein the polymer has a three-dimensional cross-linked network structure.

Embodiment 3. The secondary battery as claimed in Embodiment 1, wherein,
$R_4$ is selected from

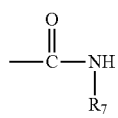

and $-(R^1)_a-X$
in which
$R_7$ is selected from H, and substituted or unsubstituted alkyl groups with 1 to 6 carbon atoms; and
a is 0 or 1; the $R^1$ is selected from phenylene, and substituted or unsubstituted alkylene groups with 1 to 6 carbon atoms, and X is selected from —COOH, —SO₃H, —SO₂H, hydroxyl, sulfhydryl, and amino.

Embodiment 4. The secondary battery as claimed in Embodiment 3, wherein,
$R_7$ is selected from H, and substituted or unsubstituted alkyl groups with 1 to 4 carbon atoms; and/or,
$R^1$ is selected from phenylene, and substituted or unsubstituted alkylene groups with 1 to 4 carbon atoms, and X is selected from —COOH, and hydroxyl.

Embodiment 5. The secondary battery as claimed in Embodiment 3 or 4, wherein the $R_4$ is selected from

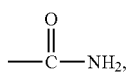

—COOH and —OH.

Embodiment 6. The secondary battery as claimed in any one of Embodiments 1-5, wherein the monomer units represented by the formula (I) comprises one or more of the following a to d,

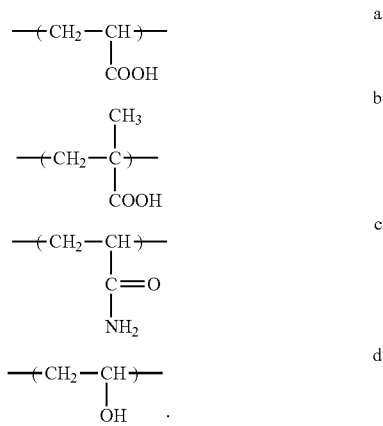

Embodiment 7. The secondary battery as claimed in Embodiment 6, wherein the crosslinkable polymer matrix comprises one or more of a copolymer of monomer units a and d, a copolymer of monomer units c and d, and a copolymer of monomer units b, c and d; preferably, the crosslinkable polymer matrix comprises a copolymer of monomer units b, c and d.

Embodiment 8. The secondary battery as claimed in any one of Embodiments 1-7, wherein the crosslinkable polymer matrix further comprises one or more of the monomer units shown in the following III-1 and III-2,

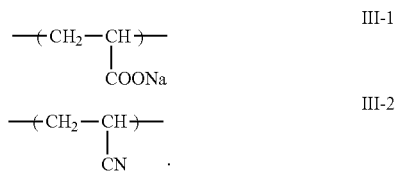

Embodiment 9. The secondary battery as claimed in Embodiment 1, wherein,
$R_5$ is selected from $-(R^2)_b-Y$, b is 0 or 1, $R_2$ is selected from straight-chain or branched alkylene groups with 1 to 8 carbon atoms, and Y is selected from halogen, alkenyl group, azide group, amino group, carboxyl group, aldehyde group, hydroxyl group, sulfonic acid group, sulfinic acid group, phenolic hydroxyl group, and epoxy group;
preferably, $R_5$ is selected from $-(R^2)_b-Y$, b is 0 or 1, $R_2$ is selected from straight-chain or branched alkylene groups with 1 to 4 carbon atoms, and Y is selected from amino group, carboxyl group, hydroxyl group and epoxy group;

Embodiment 10. The secondary battery as claimed in any one of Embodiments 1-9, wherein the binder further comprises one or more of styrene-butadiene rubber, sodium carboxymethyl cellulose, polyvinylidene fluoride, polyvinylidene fluoride copolymer, polytetrafluoroethylene, polystyrene, polyacrylonitrile, polyimide, polyacrylic acid, sodium polyacrylate, polyvinyl alcohol, sodium alginate, polymethacrylic acid and carboxymethyl chitosan.

Embodiment 11. The secondary battery as claimed in any one of Embodiments 1-10, wherein the secondary battery comprises a positive electrode plate, a negative electrode plate and a separator, and one or more of the positive electrode plate, the negative electrode plate and the separator comprise the polymer; preferably, the negative electrode plate comprises the polymer.

Embodiment 12. The secondary battery as claimed in Embodiment 11, wherein the negative electrode plate comprises a negative electrode current collector and a negative electrode film disposed on at least one surface of the negative electrode current collector, the negative electrode film comprises the polymer, and a mass percentage of the cross-linked binder composition in the negative electrode film is 0.5%, preferably from 1.0% to 3.0%.

Embodiment 13. An apparatus comprising the secondary battery as claimed in any one of Embodiments 1-12.

Embodiment 14. A binder composition comprising a cross-linkable polymer matrix and a cross-linking agent, wherein the cross-linkable polymer matrix comprises one or more of monomer units represented by formula (I), and the cross-linking agent comprises a compound represented by formula (II):

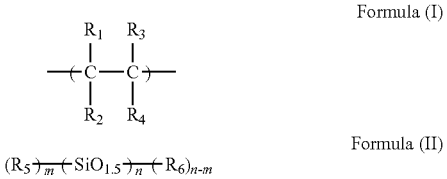

in which
R$_1$, R$_2$ and R$_3$ are each independently selected from H and straight-chain or branched-chain alkyl groups with 1 to 8 carbon atoms;
R$_4$ is a polar group containing active hydrogen(s);
R$_5$ is a reactive group to R$_4$;
R$_6$ is selected from H and substituted or unsubstituted hydrocarbon groups with 1 to 8 carbon atoms; and
n is an even number greater than or equal to 4, 2≤m≤n preferably m≥3.

Embodiment 15. The binder composition as claimed in Embodiment 14, wherein the crosslinkable polymer matrix has a weight-average molecular weight of 200,000 to 800,000, preferably of 400,000 to 600,000.

Embodiment 16. The binder composition as claimed in Embodiment 14 or 15, wherein based on the total weight of the crosslinkable polymer matrix and the crosslinking agent, a weight percentage of the crosslinkable polymer matrix is ≥70%, preferably from 75% to 95%, more preferably from 85% to 95%.

Embodiment 17. The binder composition as claimed in any one of Embodiments 14-16, wherein the binder composition further satisfies one or more of the following (1)-(2):
(1) an aqueous solution of the binder composition with a concentration of 10 wt % has a viscosity of 150 mPa·s to 20000 mPa·s, preferably from 600 mPa·s to 4000 mPa·s;
(2) an aqueous solution of the binder composition with a concentration of 10 wt % has a pH of greater than 7, preferably of 7.5 to 10.5.

Embodiment 18. A process for the preparation of a secondary battery, comprising binding a first substance and a second substance with a binder, the binder comprising a polymer obtained by crosslinking a cross-linkable polymer matrix and a cross-linking agent, the cross-linkable polymer matrix comprises one or more of monomer units represented by formula (I), and the cross-linking agent comprises a compound represented by formula (II):

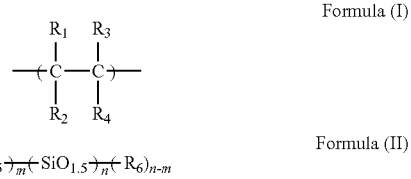

in which
R$_1$, R$_2$ and R$_3$ are each independently selected from H and straight-chain or branched-chain alkyl groups with 1 to 8 carbon atoms;
R$_4$ is a polar group containing an active hydrogen;
R$_5$ is a reactive group to R$_4$;
R$_6$ is selected from H and substituted or unsubstituted hydrocarbon groups with 1 to 8 carbon atoms; and
n is an even number greater than or equal to 4, 2≤m≤n preferably m≥3.

Embodiment 19. The process as claimed in Embodiment 18, wherein the crosslinkable polymer matrix and the cross-linking agent are crosslinked under heating conditions; preferably, the heating is carried out at a temperature of 60° C. to 160° C.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A binder composition comprising a cross-linkable polymer matrix and a cross-linking agent, wherein the cross-linkable polymer matrix comprises one or more of monomer units represented by formula (I), and the cross-linking agent comprises a compound represented by formula (II):

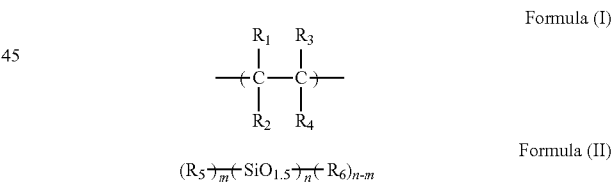

in which
R$_1$, R$_2$ and R$_3$ are each independently selected from H and straight-chain or branched-chain alkyl groups with 1 to 8 carbon atoms;
R$_4$ is selected from

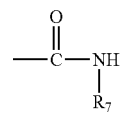

and -(R$^8$)$_a$-X
in which
R$_7$ is selected from H, and substituted or unsubstituted alkyl groups with 1 to 6 carbon atoms; and a is 0 or 1; the $R^8$ is selected from phenylene, and substituted or unsubstituted alkylene groups with 1 to 6 carbon atoms, and X is selected from —COOH, —SO$_3$H, —SO$_2$H, hydroxyl, sulfhydryl, and amino;

$R_5$ is selected from -(R$^2$)$_b$-Y, b is 0 or 1, R$^2$ is selected from straight-chain or branched alkylene groups with 1 to 4 carbon atoms, and Y is epoxy group;

$R_6$ is selected from H and substituted or unsubstituted hydrocarbon groups with 1 to 8 carbon atoms; and n is an even number greater than 4, 2≤m≤n.

2. The binder composition as claimed in claim 1, wherein based on the total weight of the crosslinkable polymer matrix and the crosslinking agent, a weight percentage of the crosslinkable polymer matrix is ≥70%.

3. The binder composition as claimed in claim 1, wherein the binder composition further satisfies one or more of the following (1)-(2):
   (1) an aqueous solution of the binder composition with a concentration of 10 wt % has a viscosity of 150 mPa s to 20000 mPa·s;
   (2) an aqueous solution of the binder composition with a concentration of 10 wt % has a pH of greater than 7.

4. The binder composition as claimed in claim 2, wherein the binder composition further satisfies one or more of the following (1)-(2):
   (1) an aqueous solution of the binder composition with a concentration of 10 wt % has a viscosity of 150 mPa s to 20000 mPa·s;
   (2) an aqueous solution of the binder composition with a concentration of 10 wt % has a pH of greater than 7.

5. A process for the preparation of a secondary battery (5), comprising binding a first substance and a second substance with a binder, the binder comprising a polymer obtained by crosslinking a cross-linkable polymer matrix and a cross-linking agent, the cross-linkable polymer matrix comprises one or more of monomer units represented by formula (I), and the cross-linking agent comprises a compound represented by formula (II):

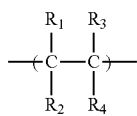

Formula (I)

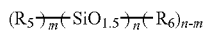

Formula (II)

in which $R_1$, $R_2$ and $R_3$ are each independently selected from H and straight-chain or branched-chain alkyl groups with 1 to 8 carbon atoms;

$R_4$ is selected from

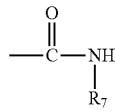

and —(R$_8$)$_a$-X in which $R_7$ is selected from H, and substituted or unsubstituted alkyl groups with 1 to 6 carbon atoms; and a is 0 or 1; the $R_8$ is selected from phenylene, and substituted or unsubstituted alkylene groups with 1 to 6 carbon atoms, and X is selected from —COOH, —SO$_3$H, —SO$_2$H, hydroxyl, sulfhydryl, and amino;

$R_5$ is selected from -(R$^2$)$_b$-Y, b is 0 or 1, R$^2$ is selected from straight-chain or branched alkylene groups with 1 to 4 carbon atoms, and Y is epoxy group;

$R_6$ is selected from H and substituted or unsubstituted hydrocarbon groups with 1 to 8 carbon atoms; and n is an even number greater than 4, 2≤m≤n, wherein the polymer has a three-dimensional cross-linked network structure.

6. The binder composition as claimed in claim 1, wherein $R_7$ is selected from H, and substituted or unsubstituted alkyl groups with 1 to 4 carbon atoms.

7. The binder composition as claimed in claim 1, wherein $R^8$ is selected from phenylene, and substituted or unsubstituted alkylene groups with 1 to 4 carbon atoms, and X is selected from —COOH, and hydroxyl.

8. The binder composition as claimed in claim 1, wherein m≥3.

9. The binder composition as claimed in claim 1, wherein based on the total weight of the crosslinkable polymer matrix and the crosslinking agent, a weight percentage of the crosslinkable polymer matrix is from 75% to 95%.

10. The binder composition as claimed in claim 1, wherein based on the total weight of the crosslinkable polymer matrix and the crosslinking agent, a weight percentage of the crosslinkable polymer matrix is from 85% to 95%.

11. The binder composition as claimed in claim 1, wherein the binder composition further satisfies one or more of the following (1)-(2):
   (1) an aqueous solution of the binder composition with a concentration of 10 wt % has a viscosity of from 600 mPa·s to 4000 mPa·s;
   (2) an aqueous solution of the binder composition with a concentration of 10 wt % has a pH of 7.5 to 10.5.

12. The binder composition as claimed in claim 2, wherein the binder composition further satisfies one or more of the following (1)-(2):
   (1) an aqueous solution of the binder composition with a concentration of 10 wt % has a viscosity of from 600 mPa·s to 4000 mPa·s;
   (2) an aqueous solution of the binder composition with a concentration of 10 wt % has a pH of 7.5 to 10.5.

13. The process as claimed in claim 5, wherein $R_7$ is selected from H, and substituted or unsubstituted alkyl groups with 1 to 4 carbon atoms.

14. The process as claimed in claim 5, wherein $R^8$ is selected from phenylene, and substituted or unsubstituted alkylene groups with 1 to 4 carbon atoms, and X is selected from —COOH, and hydroxyl.

15. The process as claimed in claim 5, wherein m≥3.

16. The process as claimed in claim 5, wherein the crosslinkable polymer matrix and the crosslinking agent are crosslinked under heating conditions.

17. The process as claimed in claim 16, wherein the heating is carried out at a temperature of 60° C. to 160° C.

* * * * *